United States Patent Office 3,490,936
Patented Jan. 20, 1970

3,490,936
ROOM TEMPERATURE STORABLE PRECATA-
LYZED SUBSTRATE FOR LAMINATES
Berton A. Cole, Renton, and Quentin F. Ruonayaara,
Kent, Wash., assignors to The Boeing Company, Se-
attle Wash., a corporation of Delaware
No Drawing. Continuation-in-part of application Ser. No.
584,047, Sept. 29, 1966. This application Feb. 26, 1969,
Ser. No. 802,647
Int. Cl. C03c 17/28; B44d 1/20
U.S. Cl. 117—54                                8 Claims

ABSTRACT OF THE DISCLOSURE

A precatalyzed substrate is disclosed for use in the manufacture of laminates of the type wherein a polymerizable liquid thermosetting resin is coated over the substrate and is thereafter induced or permitted to set by the action of a catalyst in contact therewith, the resin being of the type whose polymerization reaction is peroxide catalyzed. The substrate is manufactured by coating it with a composition consisting of a peroxide catalyst system consisting essentially of cumene hydroperoxide, dissolved in cyclohexanone, and drying the coating on the substrate, substantially entirely in an adsorbed condition on the surface thereof.

RELATED APPLICATION

This application is a continuation-in-part of our similarly titled copending application Ser. No. 584,047, filed Sept. 29, 1966.

FIELD OF THE INVENTION

This invention relates to the so-called "wet layup" procedure of producing molded or laminated articles by applying a coating of a polymerizable liquid thermosetting resin over a base material and thereafter inducing or permitting the resin to set by the action of a catalyst in contact therewith, so as to bond the two materials together. More particularly, it relates to the manufacture of such articles from peroxide cured thermosetting resins, and to a means and technique whereby a peroxide catalyst system can be precoated onto the base or substrate well in advance of the resin, i.e. a month or more in advance of the resin, and thereafter the coated substrate can be stored at ordinary room temperatures without the catalyst losing its effectiveness as an initiator of the polymerization reaction when the resin is applied. Examples of the resins in question include those which are characterized with polyunsaturation such as polystyrene, the polyesters, certain modified epoxies, and certain silicones.

BACKGROUND OF THE INVENTION INCLUDING CERTAIN OBJECTS THEREOF

In U.S. Patents 2,748,028 and 2,978,354, each patentee precatalyzed his substrate so as to avoid the problem of "pot life" when working with wet layup procedures. However, the catalyst coating had little stability or longevity on the substrate, and it was necessary to apply the resin shortly after the catalyst in order to obtain a predictable result. In U.S. Patents 3,218,190 and 3,284,262 each patentee precatalyzed his substrate with a catalyst system including a film-forming binder intended to adhesively bond the catalyst to the substrate and to protect it against decomposition. However, the binder limited the selection of a resin to those which could dissolve the binder, and also became an adulterant to the system when the resin was applied.

A principal object of the present invention is to devise a means and technique whereby a peroxide catalyst system consisting essentially of no more than the peroxide itself, can be precoated onto a substrate well in advance of the resin, i.e. a month or more in advance of the resin, and yet can be expected to retain its effectiveness as an initiator of the polymerization reaction when the resin is applied, even though the coated substrate is stored at ordinary room temperatures in the interim. Another object is to devise a means and technique of this nature in which the precatalyzed substrate retains its ability to initiate the polymerization reaction over commercially feasible periods, such as up to several months or a year or two after the application of the catalyst to the substrate. A still further object is to provide a means and technique of this nature in which the catalyst coating provides for rapid curing of the resin within commercially feasible periods, is cheap to formulate from readily available materials, is easy to apply, and if desired, is free from contaminants or additives which limit the selection of the resin. Other objects include the provision of a means and technique of this nature wherein the precoated substrate can be stored and handled under commercially feasible conditions, i.e. at ordinary room temperatures, and without undue fire hazard. They also include the provision of a means and technique of this nature wherein the coating does not affect the flexural strength or other physical properties of the final composite product, and above all, produces a predictable result when the resin is applied. Other objects and advantages will be apparent from the description of the invention which follows hereafter.

SUMMARY OF THE INVENTION

These objects and advantages are realized from our discovery that cyclohexanone has a uniquely durable preservative effect on cumene hydroperoxide, when the hydroperoxide is dissolved in the ketone, coated on the surface of a substrate, and dried in place. Moreover, this effect is sufficiently lasting, i.e. for at least a month or more, to enable the substrate to be precatalyzed long in advance of the time when the resin is applied. The coated substrate can be stored at ordinary room temperatures and, if desired, can be used at room temperature with a suitably promoted resin. There is no fire hazard in storing or handling the precoated substrate, and the final composite product has equal or better physical properties than those formed by the conventional wet layup process.

Preferably the coated substrate should be rolled and/or bagged or otherwise covered to extend the preservative effect to the maximum.

As indicated, the hydroperoxide is effective at room temperature when a suitably promoted resin is applied, such as when a polyester resin promoted with dimethylaniline and cobalt naphthenate, is applied. However, some temperature other than room temperature may be chosen for the cure process, such as one which is elevated above room temperature, and in such a case the catalyst is equally effective.

In manufacturing the precatalyzed substrate, the peroxide is dissolved in the ketone preservative, and the resulting system is applied to and dried in situ on the surface of the substrate. Ordinarily one should use enough of the catalyst to obtain the fastest possible gel time which is practicable under the circumstances. However, the amounts of peroxide and preservative which are used vary widely from one application to another. Generally speaking, the coating need only contain so much peroxide as is necessary to cure the resin which is to be applied; and theoretically there is no upper limit on the amount of peroxide which can be used. However, it is well known that too great a peroxide content may impair the physical properties of some laminates. In the fiber glass reinforced resin industry, for example, it is known that a peroxide content of above 6% by weight of the fiber glass may impair the physical properties of the laminate.

Likewise, the ketone preservative or solvent need only be present in a quantity sufficient to dissolve and apply the peroxide to the substrate. Normally this is determined by ascertaining in advance what quantity of the solvent is needed to cover the surface of the substrate. If the substrate is highly porous at the surface, it may be necessary to include an organic soluble thickener or film former in the precoating system. Such thickeners and film formers are well known and are not essential in all cases, particularly in the case of highly nonabsorbent substrate media, such as glass, linoleum, and synthetic fibers of the nature of nylon.

The following examples illustrate the invention as applied to the polyester resins. Unitary form-sustaining nonabsorbent fiber glass materials are used as the substrate.

DESCRIPTION OF THE PREFERRED EMBODIMENT

Example I

Twenty-four equally-sized pieces of fiber glass cloth were weighed and the average weight of each was recorded. Cumene hydroperoxide prepared by Reichhold Chemicals, Inc., White Plains, N.Y. (designated 46–727 cumene hydroperoxide by the Reichhold Co.), was added to each of twelve beakers in an amount approximately 5% by weight of the average recorded fiber glass weight. Thereafter, the following twelve solvents were added to the beakers, each to a different beaker: methyl alcohol, cyclohexanone, isopropyl alcohol, ethyl acetoacetate, butyl acetate, methyl ethyl ketone, pinacolone, cyclohexanone, 2,4-pentanedione, cyclopentanone, ethylene trichloride, and toluene. The amount of solvent added to each beaker was just sufficient to saturate the fiber glass; the amount of each having been determined by immersing one of the pieces of fiber glass in a preweighted beaker containing the solvent, and thereafter reweighing the beaker after the fiber glas had been suspended above the same to permit excess drippings to flow back into the beaker. The difference in weight was regarded as the amount of solvent adsorbed by the fiber glass.

Next each of the additional pieces of fiber glass was pressed into one of the twelve beakers to absorb all of the solution, and was then set aside to air dry. Eleven days later, Reichhold's 31–007 Polylite resin, a polyester resin containing 0.25% by weight of both dimethyl toluidine and cobalt naphthanate, was applied to each of the twelve precatalyzed fabrics. The following gel times and Barcol readings were observed after two hours when the fabrics had been cured at 100° F.

|  | Gel times | 2 hour Barco |
|---|---|---|
| Cyclohexanone | 10 minutes | 30 |
| Cyclopentanone | 15 minutes | 20 |
| 2,4-pentanedione | do | 0 |
| Pinacolone | do | 0 |
| Acetone | do | 0 |
| Isopropyl alcohol | 25 minutes | 0 |
| Butyl acetate | do | 0 |
| Methanol | 30 minutes | 0 |
| Toluene | do | 0 |
| Cyclohexanol | do | 0 |
| Ethylacetoacetate | do | 0 |
| Trichloroethylene | do | 0 |

Example II

In a similar manner, a fiber glass mat was impregnated with cumene hydroperoxide in an amount 10% by weight (5% peroxide) of fiber glass. After being stored in the open for forty days, a laminate was made from the Reichhold resin given in Example I. A gel time of ten minutes and a Barcol reading of fifty after two hours at 110° F. were observed.

What is claimed is:

1. A method of precatalyzing a substrate for the manufacture of laminates of the type wherein a polymerizable liquid thermosetting resin is coated over the substrate and is thereafter induced or permitted to set by the action of a catalyst in contact therewith, the resin being of the type whose polymerization reaction is peroxide catalyzed, comprising the steps of coating the substrate with a composition consisting of a peroxide catalyst system consisting essentially of cumene hydroperoxide, dissolved in cyclohexanone, and drying the coating on the substrate, substantially entirely in an adsorbed condition on the surface thereof.

2. The precatalyzed substrate produced by the method steps recited in claim 1.

3. A method of precatalyzing a strand of fiber material for a fibrous substrate for the manufacture of laminates of the type wherein a polymerizable liquid thermosetting resin is coated over the substrate and is thereafter induced or permitted to set by the action of a catalyst in contact therewith, the resin being of the type whose polymerization reaction is peroxide catalyzed, comprising the steps of coating the strand with a composition consisting of a peroxide catalyst system consisting essentially of cumene hydroperoxide, dissolved in cyclohexanone, and drying the coating on the strand, substantially entirely in an adsorbed condition on the surface thereof.

4. The method according to claim 3 wherein the fiber material is fiber glass.

5. The method according to claim 4 wherein the coated fiber glass substrate is covered to reduce its exposure to the atmosphere.

6. The method according to claim 4 wherein the hydroperoxide is present in an amount ranging from 6% by weight of the fiber glass, down to the minimal amount necessary to cure a polyester resin.

7. The precatalyzed strand of fiber material produced by the method steps recited in claim 3.

8. A process for coating surfaces with a polymerizable liquid thermosetting resin of the type whose polymerization reaction is peroxide catalyzed, comprising coating the surface with a composition consisting of a peroxide catalyst system consisting essentially of cumene hydroperoxide, dissolved in cyclohexanone, drying the coating on the surface, and thereafter applying a coating of the aforesaid polymerizable liquid thermosetting resin and allowing said latter coating to set by the action of the peroxide initiator.

References Cited

UNITED STATES PATENTS 3,218,190    11/1965    Patterson et al. ____ 117—126 X

OTHER REFERENCES

Cyclohexanon-Peroxyd-Gemisch EWM, published by Elektrochemische Werke München A.G., July 1955.

WILLIAM D. MARTIN, Primary Exmainer

D. COHEN, Assistant Examiner

U.S. Cl. X.R.

117—62.1, 62.2, 126

UNITED STATES PATENT OFFICE
CERTIFICATE OF CORRECTION

Patent No. 3,490,936　　　　　　　　　　　　　January 20, 1970

Berton A. Cole et al.

It is certified that error appears in the above identified patent and that said Letters Patent are hereby corrected as shown below:

In the heading to the printed specification, line 4, "Ruonayaara" should read -- Ruonavaara --.

Signed and sealed this 12th day of May 1970.

(SEAL)
Attest:

Edward M. Fletcher, Jr.
Attesting Officer

WILLIAM E. SCHUYLER,
Commissioner of Pate